3,213,099
N-ETHYL-5-ETHYL-PIPERIDINE-2-CARBOXYLIC ACID-2,6-XYLIDIDES
Bo Thuresson af Ekenstam and Börje Per Harald Egnér, Bofors, and Bror Gösta Pettersson, Karlskoga, Sweden, assignors to Aktiebolaget Bofors, Bofors, Sweden, a corporation of Sweden
No Drawing. Filed Nov. 14, 1963, Ser. No. 323,556
3 Claims. (Cl. 260—294)

This invention relates to surface anesthetics. More particularly, it is directed to N-ethyl-5-ethyl-piperidine-2-carboxylic acid-2,6-xylidide; and anesthetic compositions prepared therefrom.

This application is a continuation-in-part of our pending application, Serial No. 649,945, filed March 25, 1957, now abandoned, entitled Method of Manufacturing N-Alkyl-Alkylated Piperidine-Monocarboxylic Acid Amides and N-Alkyl-Alkylated-Pyrrolidine-Monocarboxylic Acid Amides.

In our said pending application, we have described, inter alia, N-ethyl-5-ethyl-piperidine-2-carboxylic acid-2,6-xylidide. We now set forth anesthetic compositions prepared from said compound and modes of using the same.

The surface anesthetic effect of N-ethyl-5-ethyl-piperidine-2-carboxylic acid-2,6-xylidide is markedly superior to that of Carbocaine, the N-methyl-piperidine-2-carboxylic acid-2,6-xylidide, which has been used as a surface anesthetic in the form of various compositions, such as solutions, gels, ointments and as sprays. It is also superior to tetracaine, the 2-dimethyl-aminoethyl ester of p-butylaminobenzoic acid.

The N-ethyl-5-ethyl-piperidine-2-carboxylic acid - 2,6-xylidide has a surface anesthetic effect of approximately 30–35 fold that of Carbocaine.

The $LD_{50}$ of the instant compound in the mouse is 7 mg.

Furthermore, the new compound has the outstanding advantage of great stability against the action of acids and alkalis. It can be sterilized by boiling at 130° C., a temperature at which tetracaine decomposes.

The following are examples in accordance with the invention:

*Example 1*

The acid chloride of 5-ethyl-piperidine-2-carboxylic acid hydrochloride is produced by the interaction of the 5-ethyl-piperidine-2-carboxylic acid with phosphorous pentachloride in acetyl chloride. Two hundred eleven parts (by weight) of 5-ethyl-piperidine-2-carboxylic acid chloride-hydrochloride in acetone are reacted with 100 parts (by weight) of 2,6-xylidine. The mixture is heated for one-half hour on a water bath. The acetone is distilled off under vacuum, and the residue is dissolved in water.

The pH thereof is adjusted to 5.5 with sodium hydroxide. The unreacted xylidine is removed by extraction with ether. The aqueous solution is treated with activated carbon; and the base precipitated with sodium hydroxide. The precipitated crystals are filtered off and washed with water and dried under vacuum.

To one part (by weight) of the free base are added 2 parts (by weight) of diethyl sulfate and the solution is heated to 100° for 4 hours. Water is added, and the excess of diethyl sulfate is extracted with ether. The aqueous solution is treated with activated carbon, and the base, which consists of N-ethyl-5-ethyl-piperdine-2-carboxylic acid-2,6-xylidide is precipitated with sodium hydroxide. The base is filtered off and washed with water.

*Example 2*

To approximately 10 kilograms of distilled water in a stainless steel container having a capacity of approximately 30 liters are added 300 grams of N-ethyl-5-ethyl-piperidine-2-carboxylic acid-2,6-xylidide hydrochloride. There are also added 16 grams of methyl-p-hydroxybenzoate and 4 grams of propyl-p-hydroxybenzoate, dissolved in a small quantity of heated distilled water. The solution is stirred. Thereafter, while stirring, there are added, in portions, during approximately 30 minutes, 1,000 grams of sodium carboxymethyl cellulose. To this solution a further quantity of distilled water is added so as to bring the total weight of the solution to 20 kilograms.

This solution is especially useful as a urethal anesthetic and being applied thereto by means of a cannula.

*Example 3*

To approximately 10 liters of distilled water in a stainless steel container having a capacity of approximately 30 liters are added 1,000 grams of N-ethyl-5-ethyl-piperidine - 2 - carboxylic acid-2,6-xylidide-hydrochloride. To this solution are added 100 grams of sodium chloride to render it isotonic. To this solution are added 25 grams of methyl-p-hydroxybenzoate dissolved in a small quantity of warm distilled water. Then, 250 ml. of 2.7% sodium hydroxide are added to the solution to bring the pH thereof to about 6.3–6.4. Then distilled water is added in an amount sufficient to bring the volume to 25 liters.

This composition is useful as a topical anesthetic and may be applied to the surface to be anesthetized in any conventional manner.

*Example 4*

An aqueous phase having a temperature of 60–70° C. is prepared from 0.1 kilogram of methyl-p-hydroxybenzoate and 59.15 kilograms of distilled water. A fatty phase is prepared, at a temperature of approximately 60° C., from the following ingredients:

0.25 kilogram of propyl-p-hydroxybenzoate,
15.5 kilograms of adeps lanae,
10 kilograms of cetanol,
10 kilograms of propylene glycol (to prevent evaporation of water), and
3 kilograms of N - ethyl-5-ethyl-piperidine-2-carboxylic acid-2,6-xylidide.

The just described fatty phase is added to the aqueous phase which is kept at a temperature of 60° C., with stirring, in the form of a thin jet which also has a temperature of 60° C. Upon completion of the addition of the fatty phase to the water phase, the temperature of the entire mixture is allowed to drop to 35° C. while stirring during the entire cooling period.

This composition is useful as a topical anesthetic, and it can be applied in any conventional manner.

*Example 5*

To one kilogram of absolute ethanol are added 1.25 kilograms of N-ethyl-5-ethyl-piperidine-2-carboxylic acid-2,6-xylidide, 5.5 kilograms of propylene glycol, 0.01 kilogram of dibromosalicylic acid (a preservative) and 0.02 kilogram of a toothpaste flavor. The solution is well stirred, and while stirring, additional absolute ethanol is added thereto to bring the solution to a total weight of 10 kilograms.

This solution can be put up in spray containers. For example, the container can be charged with 28 grams of the solution, 31.5 grams of dry chlorofluoromethane (Freon 11) and 10.5 grams of dichlorodifluoromethane (Freon 12).

This composition may be applied by spraying it directly onto the mucous membrane in the oral cavity.

The anesthetic compositions prepared in accordance with this invention can have a content of the N-ethyl-5-ethyl-piperidine-2-carboxylic acid-2,6-xylidide or an addition salt thereof with a pharmaceutically acceptable acid, as for example, the above mentioned hydrochloride of about 1 to 50%. The actual content will, as will be evident to those skilled in the art, depend upon the mode of application and the situs at which the composition is applied.

It will be understood that the foregoing description of the invention and the examples set forth are merely illustrative of the principles thereof. Accordingly, the appended claims are to be construed as defining the invention within the full spirit and scope thereof.

We claim:
1. N-ethyl-5-ethyl-piperidine-2-carboxylic acid-2,6-xylidide.
2. The hydrochloride of N-ethyl-5-ethyl-piperidine-2-carboxylic acid-2,6-xylidide.
3. A member of the group consisting of (a) N-ethyl-5-ethyl-piperidine-2-carboxylic acid-2,6-xylidide and (b) addition salts of N-ethyl-5-ethyl-piperidine-2-carboxylic acid-2,6-xylidide with a pharmaceutically acceptable acid.

References Cited by the Examiner
UNITED STATES PATENTS

| | | | |
|---|---|---|---|
| 2,425,320 | 8/47 | Hill | 252—149 |
| 2,520,153 | 8/50 | Lawson et al. | 260—294 |
| 2,529,982 | 11/50 | Walter | 260—294 |
| 2,606,155 | 8/52 | Hill | 252—149 |
| 2,792,399 | 5/57 | Ekenstam et al. | 260—294 |
| 2,838,439 | 6/58 | Goldberg | 167—52 |
| 2,842,478 | 7/58 | Gardocki et al. | 167—52 |

IRVING MARCUS, *Primary Examiner.*
JOHN D. RANDOLPH, *Examiner.*